H. M. POWELL.
VEHICLE SHAFT ATTACHMENT.
APPLICATION FILED APR. 20, 1909.
967,052.
Patented Aug. 9, 1910.
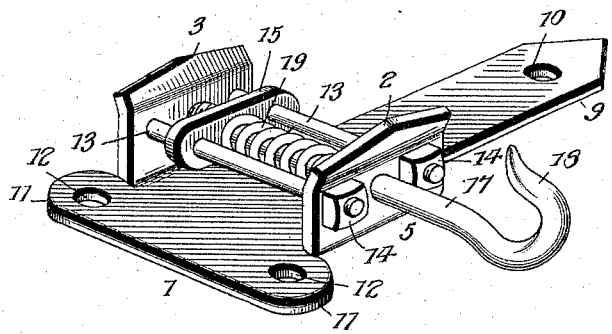
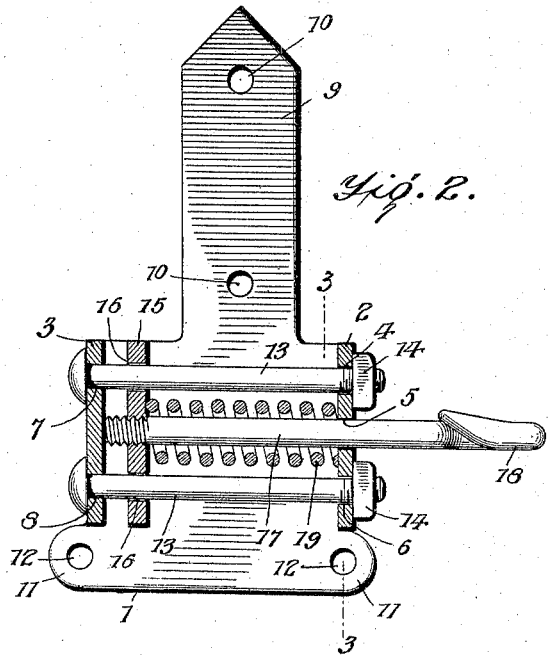
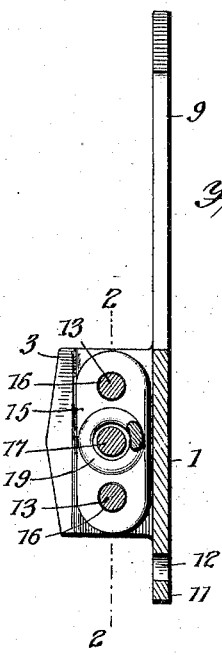
WITNESSES
L. H. Schmidt.
C. E. Trainor
INVENTOR
HENRY M. POWELL,
BY Munn & Co.
ATTORNEYS

UNITED STATES PATENT OFFICE.

HENRY MADISON POWELL, OF OMAHA, GEORGIA.

VEHICLE-SHAFT ATTACHMENT.

967,052.     Specification of Letters Patent.     Patented Aug. 9, 1910.

Application filed April 20, 1909. Serial No. 491,044.

*To all whom it may concern:*

Be it known that I, HENRY M. POWELL, a citizen of the United States, and a resident of Omaha, in the county of Stewart, State of Georgia, have invented certain new and useful Improvements in Vehicle-Shaft Attachments, of which the following is a specification.

My invention is an improvement in vehicle shaft attachments, and consists in certain novel constructions and combinations of parts hereinafter described and claimed.

The object of the invention is to provide a device for attachment to the shafts of a buggy or like vehicle, and provided with yielding means to which the trace may be attached, thus dispensing with a swingletree and relieving the shoulders of the draft animal from jerks caused by obstructions.

Referring to the drawings forming a part hereof: Figure 1 is a perspective view of the improvement; Fig. 2 is a section on the line 2—2 of Fig. 3; and Fig. 3 is a section on the line 3—3 of Fig. 2.

The present embodiment of the invention comprises a plate 1 having at each side edge an upwardly extending flange 2, 3, the flange 2 being provided with a longitudinal series of three openings 4, 5 and 6, and the flange 3 with a similar series of two openings 7 and 8, the openings 4 and 6 of one flange registering with the openings 7 and 8 of the other flange.

The plate is provided at one end with a tongue 9, having openings 10 therethrough, and at each corner of the opposite end with an ear 11, each having an opening 12 therethrough.

The registering openings 4 and 7 and 6 and 8 are traversed by bolts 13, each being secured in place by a nut 14, and a plate 15 is provided with openings 16 for receiving the bolts and is slidable thereon.

The plate 15 is provided at its center with a screw threaded opening, in which is engaged the threaded end of a rod 17 extending through the opening 5 of the flange 2, and the free end of the rod is provided with a hook. A spring 19 encircles the rod between the plate and the flange 2 and normally retains the plate in the position shown in Fig. 2.

The attachment is used in pairs, one of which is attached to each shaft by means of screws or bolts passing through the openings in the ears 11, the tongue 9 extending inwardly along the cross bar connecting the shafts, and the openings thereof are also engaged by screws or bolts. The traces engage the hook 18.

It will be evident from the description that no swingletree will be required, and the jerk on the shoulders of the draft animal at starting or on encountering obstacles will be absorbed by the spring 19.

The device is simple in construction, is not liable to easily get out of order, and may be cheaply manufactured, since there are no complicated parts. It will be understood that on the other member of the pair the hook will extend in the opposite direction, the members being made in rights and lefts, but the construction is otherwise the same. If desired, the flange 3 may be provided with an opening registering with the opening 5 of the other flange, in which case the members would be interchangeable merely by reversing the arrangement of the hooks.

I claim:

1. A device of the class described, comprising a plate provided at each side with an upwardly extending flange, and at one end with a perforated tongue, and at the other with oppositely extending perforated ears, bolts traversing the flanges in parallel and spaced relation, a plate slidable on the bolts between the flanges, a rod passing through one of the flanges between the bolts and threaded into the plate, and a spring encircling the rod between the plate and the flange, said rod being provided at its outer end with a hook, for the purpose set forth.

2. A device of the class described comprising a plate having means whereby it may be secured to the shaft and provided with oppositely arranged substantially parallel flanges, each of said flanges having an opening near each end, the openings of one flange registering with the openings of the other flanges, bolts extending through the registering openings, nuts engaging the bolts outside of the flanges, a plate having openings to receive the bolts and slidable thereon between the flanges, one of said flanges having a central opening, a rod passing through the central opening and threaded into the plate, the outer end of the rod being provided with a hook and a spring encircling the rod between the plate and the flange through which the rod passes.

HENRY MADISON POWELL.

Witnesses:
J. T. CHESNUT,
GEO. S. POPE.